United States Patent
Tanemoto et al.

(10) Patent No.: US 6,395,416 B1
(45) Date of Patent: May 28, 2002

(54) SEPARATOR FOR FUEL BATTERY AND METHOD OF PRODUCING THE SAME

(75) Inventors: Masahito Tanemoto; Shinzaburo Suzuki; Mitsuoki Shiraishi; Katsunori Ueda, all of Hamamatsu (JP)

(73) Assignee: Nichias Corporation, Tokyo (JP)

( * ) Notice: Subject to any disclaimer, the term of this patent is extended or adjusted under 35 U.S.C. 154(b) by 0 days.

(21) Appl. No.: 09/481,710

(22) Filed: Jan. 12, 2000

(30) Foreign Application Priority Data

Jan. 12, 1999 (JP) .............................. 11-005598

(51) Int. Cl.$^7$ ........................... H01M 2/00; H01M 8/02
(52) U.S. Cl. ............................... 429/34; 429/38
(58) Field of Search .............................. 429/34, 38, 39, 429/35, 36; 428/215, 332

(56) References Cited

U.S. PATENT DOCUMENTS

| | | | | |
|---|---|---|---|---|
| 4,822,538 A | * | 4/1989 | Yoshida et al. | 264/29.4 |
| 5,942,347 A | * | 8/1999 | Koncar et al. | 429/30 |
| 6,039,823 A | * | 3/2000 | Grasso et al. | 156/89.26 |
| 6,153,326 A | * | 11/2000 | Matsukawa et al. | 429/34 |

\* cited by examiner

*Primary Examiner*—Stephen Kalafut
*Assistant Examiner*—R Alejandro
(74) *Attorney, Agent, or Firm*—Nixon & Vanderhye P.C.

(57) ABSTRACT

A separator for a fuel battery comprising a conductive collector portion and a manifold portion. The collector portion is electrically conductive and includes channels for flowing reactive gas through the channels. The manifold portion includes gas introduction holes connected to the channels of the collector portion, and surrounds a circumferential edge portion of the collector portion to be integrated with the collector portion. The collector portion contains a resin binder, and the manifold portion contains a composition different from that of the collector portion.

8 Claims, 3 Drawing Sheets

SEPARATOR FOR FUEL BATTERY AND METHOD OF PRODUCING THE SAME

BACKGROUND OF THE INVENTION

1. Field of the Invention

The present invention relates to a separator for various kinds of fuel batteries.

2. Description of the Related Art

An apparatus which uses hydrogen, fossil fuel, or the like, as fuel for directly converting chemical reaction energy generated in an oxidation reaction of the fuel into electric energy is known. This apparatus is generally called a fuel battery.

There are several kinds of fuel batteries. A fuel battery called a solid polymer type is known as one of these kinds of fuel batteries. As shown in FIG. 5, the solid polymer type fuel battery 100 has a structure in which a large number of cells are connected in series or in parallel. Each of the cells has a structure fin which a positive electrode 10, an electrolyte 11 of a sold polymer, a negative electrode 12 and a separator 101 are laminated successively. Further, generally, supporting power collectors 13 are interposed between the electrodes 10 and the separators 101 and between the electrodes 12 and the separators 101.

Each of the separators 101 has channels (grooves) 104 formed in both surfaces. Fuel gas or oxidizer gas is supplied to the respective channels 104 through fuel gas introduction holes 101a and oxidizer gas introduction holes 101b. Further, the separator 101 has cooling water introduction holes 101c to form a structure in which cooling water is made to flow through the holes 101c.

The operation of a basic fuel battery 100 is as follows. Incidentally, description will be made with attention paid to one cell in order to simplify the description.

In the operation, fuel gas to be oxidized, such as hydrogen, or the like, is supplied to the negative electrode 12 whereas oxidizer gas, such as oxygen, air, or the like, is supplied to the positive electrode 10. The fuel gas and the oxidizer gas are introduced respectively through the fuel gas introduction holes 101a and the oxidizer gas introduction holes 101b of the separator 101 and flow through the channels 104 formed in the opposite surfaces of the separator 101.

In the negative electrode 12, the fuel gas is decomposed into electrons and cations (protons in the case where hydrogen is used as fuel) by the action of a catalytic material.

The cations generated in the negative electrode 12 move to the positive electrode 10 while passing through the electrolyte 11, so that the cations come into contact with the oxidizer gas such as oxygen, or the like, flowing in the positive electrode 10.

The positive electrode 10 is connected to the negative electrode 12 through a load (not shown). The electrons generated in the negative electrode 12 move to the positive electrode 10 through the load.

In the positive electrode 10, the cations of the fuel which have passed through the electrode 11 are oxidized by an oxidizer. When, for example, hydrogen and oxygen are used as fuel gas and oxidizer gas respectively, an oxidation reaction of oxygen and hydrogen occurs in the positive electrode 10.

On this occasion, electrons separated from the fuel in the negative electrode 12 move from the negative electrode 12 to the positive electrode 10 through the load to thereby contribute to the oxidation reaction in the positive electrode 10. Electromotive force is generated by the movement of the electrons.

The fuel battery 100 generally has a structure in which a large number of cells are laminated to be connected in series so that a predetermined voltage is obtained. The number of cells to be laminated is generally from the order of tens to the order of hundreds or more.

Further, in the structure in which such a large number of cells are laminated, adjacent cells are separated from each other by the separator 101.

Except for the edge portion of the laminated structure, the fuel gas such as hydrogen, or the like, flows through one surface of the separator 101 and the oxidizer gas such as oxygen, or the like, flows through the other surface of the separator 101.

Because the fuel gas and the oxidizer gas must not be mixed with each other, it is a matter of course that the separator 101 requires a function of separating the two gases from each other. That is, the separator 101 requires gas-tightness so that no gas permeates through the separator 101 per se.

Further, because the separator 101 serves also as a member for electrically connecting the laminated cells to each other directly, the separator 101 requires a high electrically conductive property (low resistance) as the quality of the material thereof.

Further, the separator 101 requires resistance to water generated as a result of oxidation (water resistance), corrosion resistance to electrolyte contained in the electrolyte 11 and corrosion resistance to the oxidizer.

Further, because a strong compressing force is applied to the separator 101 in a condition that cells are laminated one another, the separator 101 requires great strength to withstand the compressing force.

As configuration for satisfying the aforementioned requirements, there are the following techniques.

One of the techniques is a technique of obtaining the separator 101 by cutting a block which is obtained by baking a vitreous carbon material also called glassy carbon (baked carbon).

Channels 104 are formed in the separator 101 so that the fuel gas and the oxidizer gas are made to flow through the channels 104. Because glassy carbon is deformed greatly when baked, such a method that the separator 101 is produced by baking glassy carbon after molding the glassy carbon in a non-baked state cannot be applied. It is, therefore, necessary to obtain a required shape by cutting a glassy carbon block after the block is obtained by baking.

The baked glassy carbon is, however, so hard that high cost is required for cutting such baked glassy carbon. Furthermore, cutting loss occurs, so that the material is wasted. In view of this point, high cost is also required.

As another technique for obtaining the separator 101, there is a method of obtaining the separator 101 from a mixed or kneaded matter. The mixed or kneaded matter is prepared by mixing or kneading a resin with a carbon type electrically conductive filler such as graphite powder or expansive graphite powder.

In this method, a predetermined shape can be obtained at a low cost by molding or hot-pressing. That is, a predetermined channel structure (a gas path structure which makes gas flow evenly) can be obtained relatively easily.

Although it is preferable, from the standpoint of electric power generating efficiency, that the electrically conductive property of the separator 101 is high, the amount of the electrically conductive filler to be mixed must be increased for obtaining the high electrically conductive property. As a result, there arises a problem that both strength and movability are lowered. Further, because the starting material is powder, there is another problem that dimensional stability in molding is bad.

Further, the separator 101 requires a function of enclosing the fuel gas and the oxidizer gas in predetermined channels 104 to prevent the gases from leaking out of the cell (sealing function). The sealing function is, however, spoiled when dimensional stability is lowered.

Further, because a large compressing force is applied to the cells in a state in which the cells are laminated, the separator 101 requires strength to withstand the compressing force. If the separator 101 is deformed, cracked or partially broken by the compressing force, the aforementioned gastightness or sealing property is spoiled undesirably. It is apparent also from this standpoint that increase in amount of the carbon type electrically conductive filler to be mixed is disadvantageous. That is, it is apparent that the strength of the separator 101 is lowered if the amount of the carbon type electrically conductive filler to be mixed is increased.

Furthermore, increase in amount of the electrically conductive filler to be mixed brings about a further problem that gas impermeability is lowered.

As described above, the techniques for obtaining the separator 101 for a fuel battery have problems as follows:
(1) In the method using glassy carbon, there is a problem in the cost of production.
(2) In the method using a resin material and an electrically conductive filler such as graphite powder, expansive graphite powder, or the like, there is a problem that it is difficult to make an electrically conductive property consistent with other requirements.

SUMMARY OF THE INVENTION

Therefore, the object of the present invention is to provide a technique of producing a separator for use in a fuel battery to satisfy simultaneously the following requirements:
the cost of production is low;
electrically conductive property is high;
gas-tightness is high;
dimensional stability is high (dimensional variation of products is small); and
mechanical strength is high.

In the present invention, attention is paid to the fact that a portion requiring great gas-tightness, great dimensional stability and great mechanical strength and a portion requiring a high electrically conductive property are distinguished from each other in a separator for a fuel battery obtained from a kneaded matter made of an electrically conductive filler and a resin material. Accordingly, the present invention is basically characterized in that optimum materials are used in the two portions respectively and a resin binder is contained in a collector portion.

In order to solve the above problems, there is provided a separator for a fuel battery having an electrically conductive property and being constituted by a collector portion provided with channels formed for making reactive gas flow through the channels, and a manifold portion having a composition different from that of the collector portion and provided with reactive gas introduction holes connected to the channels, the manifold portion being integrated with the collector portion so that a circumferential edge portion of the collector portion is surrounded by the manifold portion, wherein the collector portion contains a resin binder.

In order to solve the similar problems, there is provided a first method of producing a separator for a fuel battery comprising the steps of: forming the collector portion by using at least a resin binder and an electrically conductive filler as raw materials; and integrating the manifold portion with the collector portion by injection-molding a manifold portion-forming material of a composition different from that of the collector portion in the condition that the collector portion is disposed in a mold.

Further there is provided a second method of producing a separator for a fuel battery comprising the steps of: forming the collector portion by using at least a resin binder and an electrically conductive filler as raw materials; forming the manifold portion from a material different from that of the collector portion so that the manifold portion is divided into two in a direction of the plane of the manifold portion; and integrating the manifold portion with the collector portion in the condition that the collector portion is clamped by the manifold portion.

Further, there is provided a third method of producing a separator for a fuel battery comprising the steps of: forming the collector portion at least by using a resin binder and an electrically conductive filler as raw materials; forming a half of the manifold portion on one surface of the collector portion by injection-molding a manifold-portion-forming material of a composition different from that of the collector portion in the condition that the collector portion is disposed in a mold; and forming the other half of the manifold portion on the other surface of the collector portion by injection-molding the manifold-portion-forming material in the condition that the collector portion integrated with the one half of the manifold portion formed on the one surface of the collector portion is disposed in a mold.

The separator for use in a fuel battery according to the present invention is divided into a collector portion and a manifold portion. The collector portion is formed from a resin material which is mixed with a large amount of an electrically conductive filler so that the resin material has a high electrically conductive property at the sacrifice of gas-tightness, dimensional stability and mechanical strength.

On the other hand, the manifold portion is formed from a resin material which is mixed with a small amount of the electrically conductive filler or preferably contains no electrically conductive filler so that the resin material has gas-tightness, dimensional stability and mechanical strength preferentially. Further, because the manifold portion can be made to have high resistance (substantially, electrically insulating matter), there can be achieved a structure in which no current flows through the manifold portion so that there is no electric power loss caused by Joule heat. Further, generated electric power can be prevented from escaping from the manifold portion through a support portion. Further, containing of the resin material also in the collector portion satisfies the requirements of sealing function, dimensional stability, strength and moldability in the collector portion.

In this manner, a separator for a fuel battery with low electric power loss, high gas-tightness, high dimensional stability and high mechanical strength can be obtained.

DETAILED DESCRIPTION OF THE PREFERRED EMBODIMENT

The present invention will be described below in detail.

Figure 5:
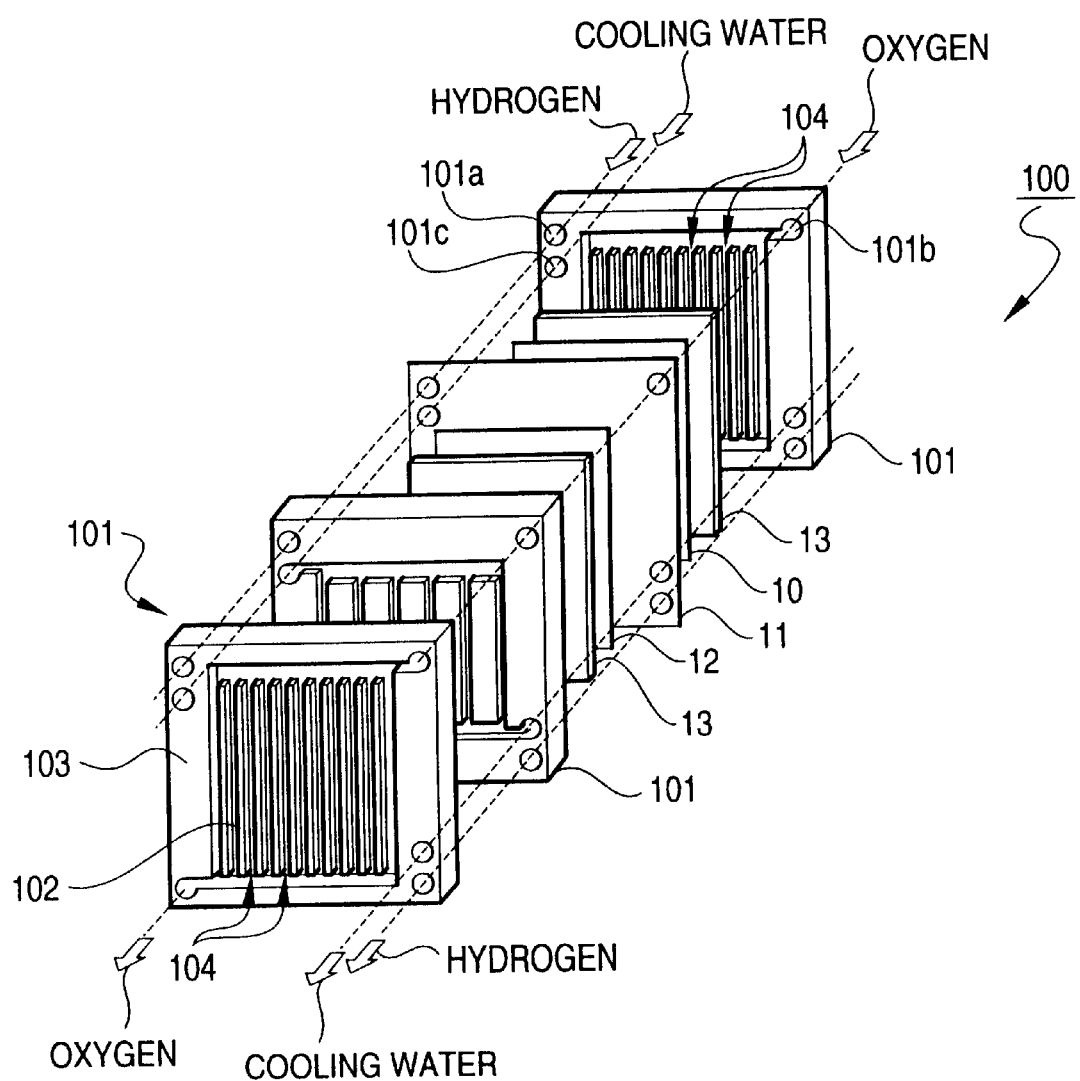
FIG. 5 is an exploded configuration view showing the outline of a fuel battery.

In the structure of the separator 101 shown as an example in FIG. 5, a center portion 102 in which channels 104 are formed requires a function for collecting generated electric power, that is, requires a high electrically conductive property. In the present invention, this portion 102 is called collector portion.

On the other hand, a peripheral portion (edge portion) 103 of the separator 101 requires a sealing property to prevent gases from leaking out of the cells. Accordingly, the portion 103 requires high mechanical strength and high dimensional stability. Furthermore, the portion 103 requires physical properties of gas impermeability. In the present invention, this portion is called manifold portion.

In the present invention, attention is paid to this standpoint, so that the collector portion 102 in the center portion of the separator 101 is formed to have an electrically conductive property preferentially by mixing an electrically conductive filler whereas the manifold portion 103 in the peripheral portion of the separator 101 is formed to have both strength and dimensional stability preferentially by mixing no electrically conductive filler. Further, a resin binder is contained in the collector portion so that both strength and dimensional stability required for the collector portion are ensured.

In this manner, the separator 101 which satisfies the aforementioned requirements simultaneously can be obtained.

The manifold portion 103 is a flame-like portion which exists so as to surround the circumferential edge portion of the collector portion 102 in which the channels 104 are formed. The manifold portion 103 has a sealing function to prevent the fuel gas and the oxidizer gas from leaking out. Further, the manifold portion 103 is provided with fuel gas introduction holes 101a, oxidizer gas introduction holes 101b and cooling water introduction holes 101c.

Further, the manifold portion 103 is also a portion on which a large compressing force acts. Further, the manifold portion 103 requires a sealing property. Accordingly, the manifold portion 103 requires high mechanical strength and high dimensional stability.

Accordingly, the manifold portion 103 may be made to be a portion which sacrifices electric performance in pursuit of other requirements. Therefore, the manifold portion 103 as a whole is preferably formed from a resin material. Alternatively, an electrically nonconductive filler such as glass fiber, or the like, may be mixed with the resin material so that improvement of mechanical strength can be attained. If there is no problem in mechanical strength, etc., a small amount of an electrically conductive filler can be mixed with the resin material. By mixing a small amount of the electrically conductive filler, the adhesion of the manifold portion 103 to the collector portion 102 containing the electrically conductive filler can be improved. It is, however, necessary to take care that the electric conductivity of the manifold portion 103 does not become too high.

As the resin material, a phenol resin, an epoxy resin, a nylon resin, a liquid-crystal polyester resin, or the like, can be used singly or in mixture. Compositions for the manifold portion 103 are exemplified in the following Table. Among these compositions, it may be said that it is preferable to use the liquid-crystal polyester resin singly or to use a mixture of 80% by weight or more of the liquid-crystal polyester resin with glass fiber.

TABLE 1

Composition for the Manifold Portion (unit: part by weight)

| | Liquid-Crystal Polyester Resin | Phenol Resin | Epoxy Resin | Nylon Resin | Glass Fiber | Strength | Sealing Function | Dimensional Stability | Moldability | Evaluation |
|---|---|---|---|---|---|---|---|---|---|---|
| 1 | 100 | — | — | — | — | High | High | High | High | ○ |
| 2 | — | 100 | — | — | — | High | High | Low | Medium | |
| 3 | — | — | 100 | — | — | High | High | Low | Medium | |
| 4 | — | — | — | 100 | — | High | High | Low | Medium | |
| 5 | 90 | — | — | — | 10 | High | High | High | High | ○ |
| 6 | — | 90 | — | — | 10 | High | High | Medium | Low | |
| 7 | — | — | 90 | — | 10 | High | High | Medium | Low | |
| 8 | — | — | — | 90 | 10 | High | High | Medium | Low | |
| 9 | 80 | — | — | — | 20 | High | High | High | Medium | ○ |
| 10 | — | 80 | — | — | 20 | High | High | Medium | Low | |
| 11 | — | — | 80 | — | 20 | High | High | Medium | Low | |
| 12 | — | — | — | 80 | 20 | High | High | Medium | Low | |

On the other hand, the collector portion 102 has an electrically conductive property and is provided with channels 104. The channels 104 are formed in both surfaces of the collector portion 102 so that the fuel gas and the oxidizer gas are made to flow through the channels 104. To integrate the collector portion 102 with the manifold portion 103, an edge portion 102a is further formed so as to surround the channels 104 (see FIG. 3).

The collector portion 102 is obtained by binding an electrically conductive filler with a resin binder. As the electrically conductive filler, powder such as carbon powder, graphite powder, expansive graphite powder, or the like, can be used singly or in mixture. Of these powders, expansive graphite is particularly preferred because low electric resistance is obtained. Expansive graphite is used singly or as a main component. On the other hand, as the resin to serve as a binder, a phenol resin, an epoxy resin, a polyimide resin, a liquid-crystal polyester resin, or the like, can be used singly or in mixture.

Compositions for the collector portion 102 are exemplified in the following Table. It may be said that 60% by weight or more of expansive graphite in single use as the electrically conductive filler, or 70% by weight or more of expansive graphite in use as a main component is preferred, and that an epoxy resin or a phenol resin is preferably used as the resin. Incidentally, apparent from the following Table, the mixing of the resin binder in the collector portion makes it possible to simultaneously satisfy not only an electrically conductive property but also other requirements though the collector portion pursues electric performance first.

manifold-portion-forming material (for example, a mixture of 80 parts by weight of liquid-crystal polyester resin to 20 parts by weight of glass fiber) is injection-molded to thereby integrally mold a separator 101.

In this manner, there is achieved a structure in which the manifold portion 103 has an electrically insulating property, high mechanical strength and high dimensional stability whereas the collector portion 102 has a high electrically conductive property because of the mixing of a filler.

TABLE 2

Composition for the Collector portion (unit: part by weight)

|  | Expansive Graphite | Carbon Powder | Epoxy Resin | Phenol Resin | Liquid-Crystal Polyester Resin | Polyimide Resin | Electrically Conductive property | Sealing Function | Dimensional Stability | Strength | Moldability | Evaluation |
|---|---|---|---|---|---|---|---|---|---|---|---|---|
| 1 | 100 | — | — | — | — | — | High | Low | Low | Low | Low |  |
| 2 | 90 | — | 10 | — | — | — | High | Medium | Medium | Medium | Medium | o |
| 3 | 90 | — | — | 10 | — | — | High | Medium | Medium | Medium | Medium | o |
| 4 | 90 | — | — | — | 10 | — | High | Medium | Medium | Medium | Low |  |
| 5 | 90 | — | — | — | — | 10 | High | Medium | Medium | Medium | Low |  |
| 6 | 60 | — | 40 | — | — | — | Medium | High | High | High | High | o |
| 7 | 60 | — | — | 40 | — | — | Medium | High | High | High | High | o |
| 8 | 60 | — | — | — | 40 | — | Medium | High | High | High | Low |  |
| 9 | 60 | — | — | — | — | 40 | Medium | High | High | High | Low |  |
| 10 | 80 | 10 | 10 | — | — | — | High | Medium | Medium | Medium | Medium | o |
| 11 | 80 | 10 | — | 10 | — | — | High | Medium | Medium | Medium | Medium | o |
| 12 | 80 | 10 | — | — | 10 | — | High | Medium | Medium | High | Low |  |
| 13 | 80 | 10 | — | — | — | 10 | High | Medium | Medium | High | Low |  |
| 14 | 20 | 40 | 40 | — | — | — | Medium | High | High | High | Medium |  |
| 15 | 20 | 40 | — | 40 | — | — | Medium | High | High | High | Medium |  |
| 16 | 20 | 40 | — | — | 40 | — | Medium | High | High | High | Low |  |
| 17 | 20 | 40 | — | — | — | 40 | Medium | High | High | High | Low |  |

Figure 1:
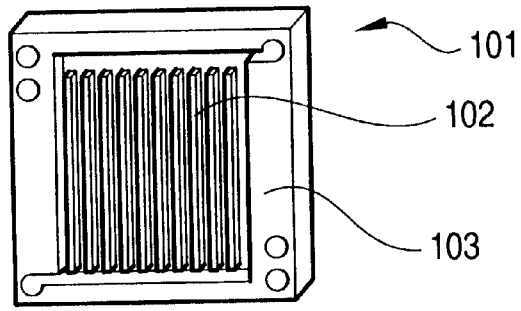
FIG. 1 is a perspective view showing the external appearance of a separator according to the present invention.

The collector portion 102 is integrated with the manifold portion 103 to thereby accomplish the separator 101 for a fuel battery according to the present invention. As for the method of integration, press-molding and another method shown in embodiments which will be described later are preferable. As shown in FIG. 1, the thus obtained separator 101 is configured so that the collector portion 102 is disposed in the center portion and the periphery of the collector portion 102 is surrounded by the manifold portion 103. The separator 101 exhibits the same external appearance as that of the background-art separator 101 shown in FIG. 5.

In the above description, the constituent resin material for the collector portion 102 may be made different in kind from that for the manifold portion 103. In this case, it is important to select a combination of materials so that the collector portion 102 is fitted to the manifold portion 103 well so that integration of the two portions is not spoiled.

The present invention will be described below more in detail while the process of production is taken as an example.

First Embodiment

A method of producing a separator 101 by integrally molding a collector portion 102 and a manifold portion 103 will be described below with reference to FIGS. 2A and 2B.

Figure 2A:
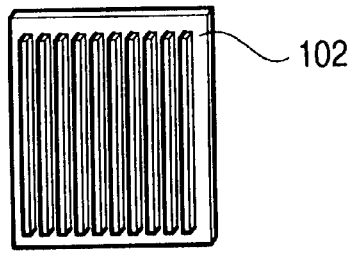
FIGS. 2A and 2B are views showing an example of process for producing the separator according to the present invention.
Figure 2B:
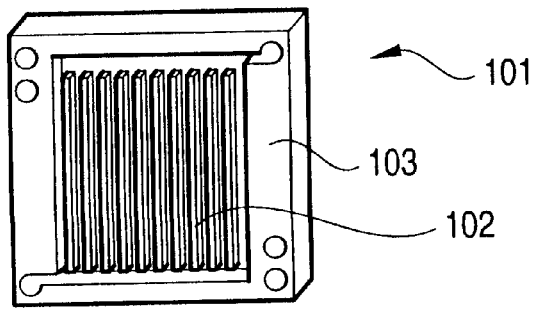

First, as shown in FIG. 2A, a collector-portion-forming material (for example, a mixture of 70 parts by weight of expansive graphite to 30 parts by weight of epoxy resin) is molded to thereby produce a collector portion 102 which has channels 104 and edge portions 102a in both surfaces. Press-molding or injection-molding can be used as the molding method. Then, as shown in FIG. 2B, in the condition that the collector portion 102 is put in a mold, a

Second Embodiment

Figure 3:
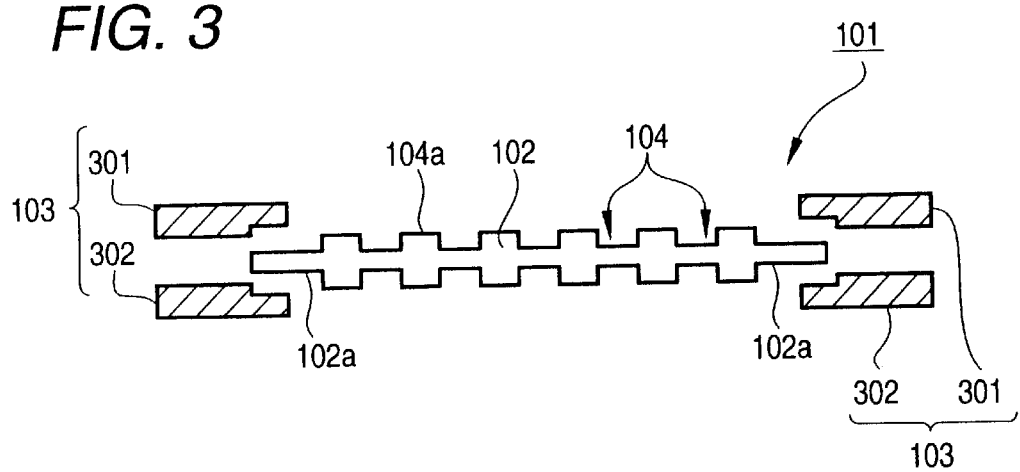
FIG. 3 is a view showing another example of process for producing the separator according to the present invention.

As shown in FIG. 3, the aforementioned collector-portion-forming material is molded to thereby produce a collector portion 102 which has channels 104 and edge portions 102a in both surfaces. Further, the manifold-portion-forming material is molded to thereby produce a pair of members 301 and 302 constituting a manifold portion 103. The members 301 and 302 have a structure in which the man fold portion 103 is divided into two in a direction of the plane of the manifold portion 103. Press-molding or injection-molding can be used as the method for molding each of the members 301 and 302. Further, the thickness of each of the members 301 and 302 is made equal to the height of each of partition walls 104a forming the channels 104 of the collector portion 102.

Further, the collector portion 102 is integrated with the members 301 and 302 so that the edge portions 102a of the collector portion 102 are clamped by the members 301 and 302. In such a manner, the separator 101 according to the present invention is accomplished. Incidentally, an adhesive agent or pins can be used for the integration.

In the producing process shown in this embodiment, the edge portions 102a of the collector portion 102 low in mechanical strength can be prevented from being broken though there is a fear that the edge portions 102a may be broken in the case where press-molding or injection-molding is used.

Third Embodiment

Figure 4A:
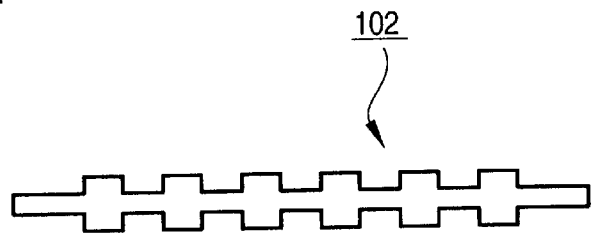
FIGS. 4A, 4B, and 4C are views showing a further example of process for producing the separator according to the present invention.
Figure 4B:
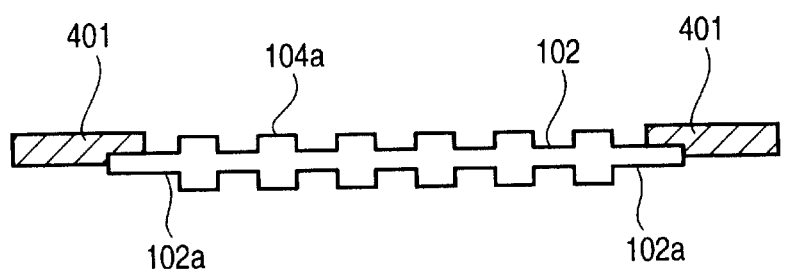
Figure 4C:
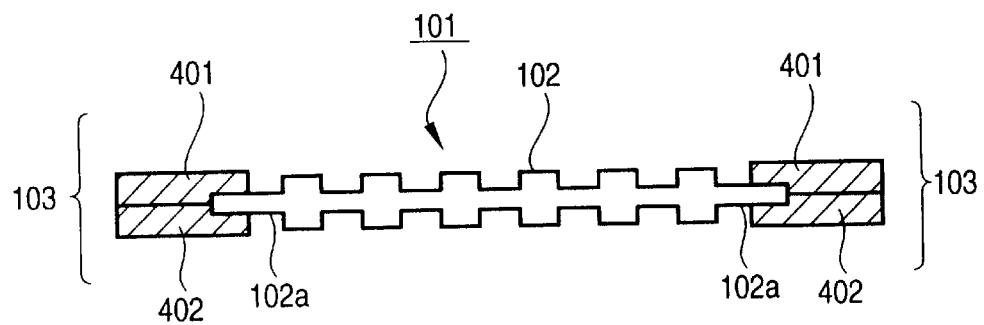

As shown in FIG. 4A, the aforementioned collector-portion-forming material is molded to thereby produce a collector portion 102 having channels 104 and edge portions 102a in both surfaces. Then, in the condition that the collector portion 102 is put in a mold, a half (manifold member) 401 of a manifold portion 103 in a direction of the plane of the manifold portion 103 is formed on one surface of the edge portions 102a by an injection molding method, as shown in FIG. 4B. Then, the remaining half (manifold member) 402 of the manifold portion 103 is formed on the other surface of the edge portions 102a by an injection molding method, as shown in FIG. 4C. In this manner, the edge portions 102a of the collector portion 102 are held by the members 401 and 402 to thereby accomplish the separator 101 according to the present invention.

In the producing process shown in this embodiment, injection molding for producing the manifold portion 103 is divided into two steps. Accordingly, pressure applied to the edge portions 102a of the collector portion 102 is reduced when the manifold portion 103 is formed by injection-molding. Accordingly, the edge portions 102a can be prevented from being broken.

As described above, according to the present invention, it is possible to provide a separator for a fuel battery which can satisfy the following requirements simultaneously:

the cost of production is low;

electrically conductive property is high;

gas-tightness is high;

dimensional stability is high (dimensional variation of products is small); and mechanical strength is high.

While only a certain embodiment of the invention has been specifically described herein, it will be apparent that numerous modifications may be made thereto without departing from the spirit and scope of the invention.

The present invention is based on Japanese Patent Application No. He. 11-5598 which is incorporated herein by reference.

What is claimed is:

1. A separator for a fuel battery comprising:

an electrically conductive collector portion including channels for flowing gas therethrough; and a manifold portion including gas introduction holes connected to the channels of said collector portion, and surrounding a circumferential edge portion of said collector portion to be integrated with said collector portion, wherein a principal ingredient of said collector portion is formed of an electrically conductive filler, and wherein a principal ingredient of said manifold portion is formed of resin.

2. The separator according to claim 1, wherein said manifold portion has mechanical strength higher than said collector portion.

3. The separator according to claim 1, wherein an electrically conductive filler is contained only in said collector portion.

4. The separator according to claim 1, wherein said manifold portion further includes cooling water introduction holes.

5. The separator according to claim 1, wherein said manifold portion is made of liquid-crystal polyester resin.

6. The separator according to claim 1, wherein said manifold portion is made of a mixture of 80% by weight or more of the liquid-crystal polyester resin with glass fiber.

7. The separator according to claim 1, wherein the resin binder of said collector portion is made of one of an epoxy resin and a phenol resin.

8. The separator according to claim 1, wherein said collector portion includes 60%, or more of the electrically conductive filler.

* * * * *